United States Patent [19]

McNulty et al.

[11] Patent Number: 5,256,879
[45] Date of Patent: Oct. 26, 1993

[54] MICRODOSIMETRY RADIATION ANALYSIS METHOD AND DEVICE

[75] Inventors: Peter J. McNulty, Seneca; W. Joseph Beauvais, Central; David R. Roth, Clemson, all of S.C.

[73] Assignee: Clemson University, Clemson, S.C.

[21] Appl. No.: 774,467

[22] Filed: Oct. 10, 1991

[51] Int. Cl.$^5$ ............................................. G01T 1/24
[52] U.S. Cl. ........................... 250/370.06; 250/370.07
[58] Field of Search ..................... 250/370.06, 370.07, 250/370.05, 370.01, 370.02; 357/30, 32

[56] References Cited

U.S. PATENT DOCUMENTS

| | | | |
|---|---|---|---|
| 4,485,422 | 11/1984 | Snaper et al. | 364/414 |
| 4,517,464 | 5/1985 | Heath et al. | 250/370 |
| 4,591,984 | 5/1986 | Mori | 364/414 |
| 4,608,655 | 8/1986 | Wolf et al. | 364/569 |
| 4,672,544 | 6/1987 | Chizallet et al. | 364/414 |
| 4,757,202 | 7/1988 | East | 250/370.07 |
| 4,859,853 | 8/1989 | Kronenberg | 250/370.07 |

OTHER PUBLICATIONS

"Predicting Single Event Phenomena in Natural Space Environments" by P. J. McNulty Microelectronics for the Natural Radiation Environments of Space, Jul. 16, 1990, pp. 3-44.

"Characterizing Complex Radiation Environments Using More (Monitor of Radiation Effects)" by P. J. McNulty, D. R. Roth, E. G. Stassinopoulos, and W. J. Stapor, Published Oct. 15-18, 1990.

"PMOS Dosimeters: Long-Term Annealing and Neutron Response", IEEE Transactions on Nuclear Science, Vol. NS-33, No. 6, Dec., 1986 by Blamires, Toterdell, Holmes-Siedle, and Adams.

"Comparison of the Charge Collecting Properties of Junctions and the Seu Response of Microelectronic Circuits" by McNulty, Roth, Beauvais, Abdel-Kader, and Dinge, (Sep. 6, 1990).

"A Stochastic, Weighted Hit Size Theory of Cellular Radiobiological Action", by V. P. Bond and M. N. Varma, Published by the Commission of the Eureopean Communities, Proceeding of the Eighth Symposium, Sep. 27-Oct. 1, 1992, Report Eur 8395 EN.

Primary Examiner—Paul M. Dzierzynski
Assistant Examiner—Richard Hanig
Attorney, Agent, or Firm—Dority & Manning

[57] ABSTRACT

Apparatus and method for qualitatively and quantitatively analyzing a complex radiation field are provided. A microdosimetry device is provided having an array of microstructure parallel p-n junctions. Each junction defines a predetermined sensitive volume within which a voltage pulse is produced responsive to incident radiation. Circuitry in communication with the detector array generates digital pulse signals representative of the voltage pulses induced within the sensitive volumes responsive to incident radiation, and further provides a summation of the digital pulses occurring at particular energies. The summations of digital pulses are compared to known energies generated by known ionizing particles in comparable sensitive volumes to generate an dose equivalent estimate. Apparatus and method for calculating the total dose from an incident radiation field may also be included.

40 Claims, 4 Drawing Sheets

Fig.1
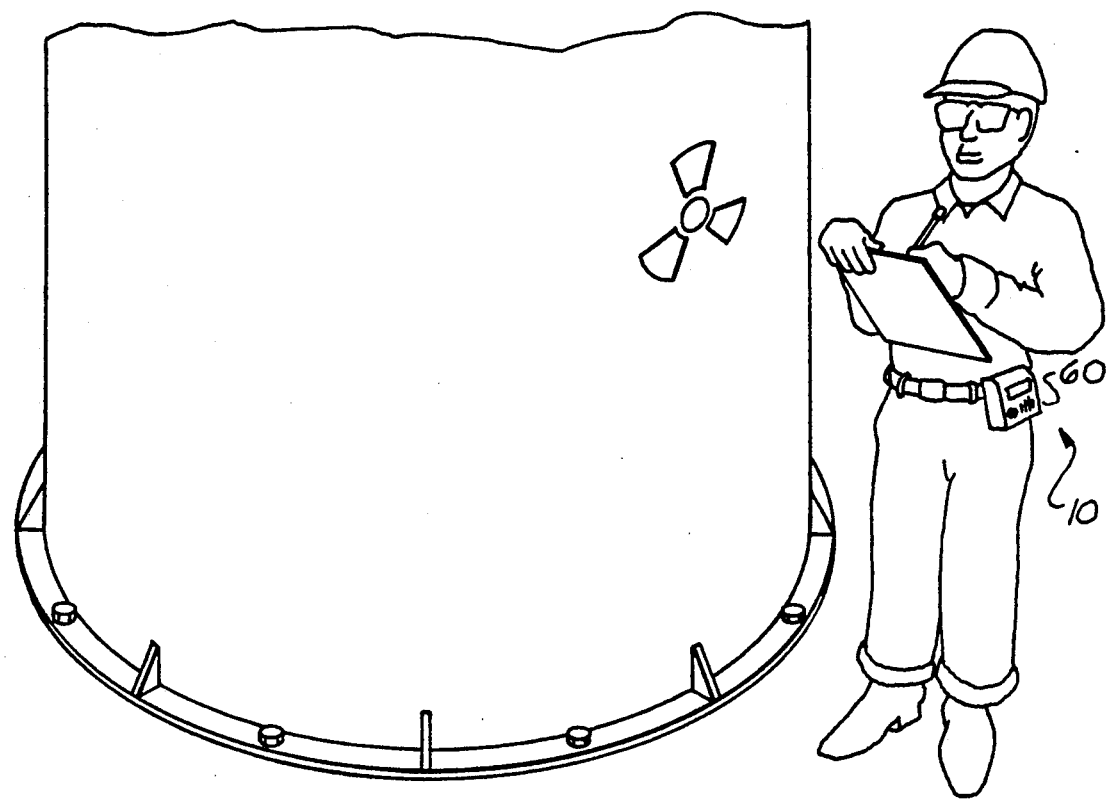
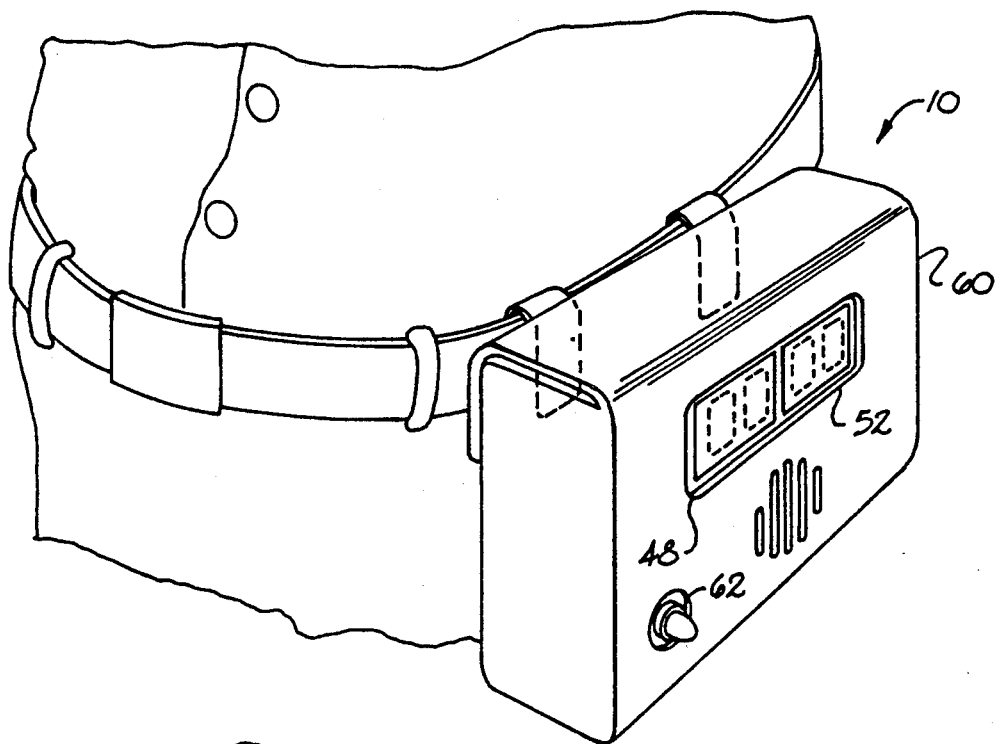
Fig.2

MICRODOSIMETRY RADIATION ANALYSIS METHOD AND DEVICE

BACKGROUND OF THE INVENTION

The present invention generally concerns radiation detection devices and monitoring methods, and more particularly concerns dosimetry devices and methods for personal and area uses.

Monitoring and measuring the effects of radiation upon biological organisms and microelectronic circuits are critical concerns in the nuclear energy applications (e.g., nuclear power stations, nuclear medicine, nuclear weapons industry, nuclear propulsion systems, etc.) and space exploration technologies, especially in the low dose natural radiation environment of space. Modern microelectronic components in particular are known to be subject to a wide variety of detrimental radiation induced phenomena from sporadic operation to total failure.

Various dosimetry and radiation detection devices are known and utilized in the art for measuring and predicting the effects of a radiation field upon biological tissue in particular and microelectronics in general. These devices include thermoluminesent dosimeters (TLD), ionization chambers, and Geiger tubes. These devices, however, are generally limited in that they effectively only provide a total dose measurement from a radiation field. To accurately predict the risk involved in exposing an organism or microelectronic circuit to some complex radiation environment, it is imperative to analyze the qualitative effects of the various ionizing particles in the complex radiation field. The conventional dosimetry devices generally have not effectively accomplished this goal.

In the relatively recent past, the art has turned its attention to metal oxide semiconductor devices as radiation detectors. When a metal oxide semiconductor device is irradiated, charge builds up in the oxide layer. These charges can be measured and this has proven a useful dosimetry principle. See, for example, U.S. Pat. No. 4,517,464 to Heath et al.; U.S. Pat. No. 4,859,853 to Kronenbero: U.S. Pat. No. 4,757,202 to East; U.S. Pat. No. 4,608,655 to Wolf et al.: and the scholarly publication in IEEE Transactions on Nuclear Science, Volume NS-33, No. 6, December 1986, entitled "PMOS Dosimeters: Long-term Annealing and Neutron Response."

The principles and operation of the solid-state detectors are known and understood by those skilled in the art. However, these solid-state particle detectors are again generally only useful for a total quantitative analysis of a radiation field. For example, with a typical conventional silicon surface barrier detector consisting of a relatively large (e.g., 25 mm$^2$×100 micron) biased p-n junction, circuitry is generally provided to measure and record the total amount of charge collected as a result of the junction being traversed by charged ionizing particles. The voltage pulse generated is normally sent to a preamplifier used in pulse height analysis. The preamplifier integrates the voltage pulse over time and generates a signal which is proportional to the total charge collected across the junction. This signal is then sent to a pulse height analyzer for quantitative analysis. For a full discussion of the operation of solid-state detectors such as the silicon surface barrier detector and pulse height analyzers, see the work by G. F. Knoll, "Radiation Detection and Measurements," John Wiley & Sons, New York, N.Y., 1989.

The junctions of conventional solid-state particle detectors are relatively large, as discussed above. These junctions do not simulate a microstructure as tiny as a biological cell or the p-n junction of a microelectronic semiconductor. Thus the conventional solid-state detector generally cannot qualitatively analyze an incident radiation field on a micron level to determine precisely what type of ionizing particle is producing the induced voltage within the junction. Such detectors generate a total voltage from the total incident radiation field and circuitry is known in the art for measuring this total voltage. However, this analysis provides very little information on the effects of radiation on the critical microstructure level.

Conventional solid-state particle detectors generally do not provide adequate means for measuring the energy of specific particles that make up the complex radiation environment, nor for predicting the detrimental effects the constituent elements of a complex radiation field will have upon a microvolume of tissue or a microelectronic junction. For instance, a conventional solid-state dosimeter will yield a fairly accurate estimate o a total dose from an incident complex radiation field, but cannot separate the contributions from the individual types of radiation that make up the complex radiation field. Such information is essential to estimating the risk to a biological organism or microelectronic circuit. The probability of whether an incident ionizing particle will result, for example, in a genetic chromosome mutation in a biological cell or an upset event in a microelectronic junction depends upon the amount of energy the incident particle deposits within the microstructure biological cell or electronic junction. Conventional dosimetry devices generally do not provide this qualitative information.

Fairly recently, significant work has been done in predicting single event phenomena in modern microelectronic circuits. Modern microelectronic circuits are subject to a variety of single event phenomena, or "upsets," caused by incident radiation. Such circuits may, for example, consist of a particularly arranged array of p-n junctions. Typically, operation of the circuit involves the selected storage and switching of various electrical charges (or logic states) at the given junction When ionizing particles traverse these junctions, they cause sudden undesirable swings in the bias (i.e., the electrical charge) across the junction. The generation of a relatively large charge at these critical locations on the die of a microelectronic chip can alter the electrical condition, and hence the logic state, of an element, which is referred to as an "upset."

Traversal of certain junctions on a circuit by an ionizing particle would be sufficient to induce changes in the electrical state in any circuit element, unless they are specifically hardened against such changes. Hardening adds to cost while sometimes adversely affecting performance or conflicting with design constraints, e.g., weight limitations. Upset phenomena is a significant concern in the microelectronic field, especially in the space technology area where these types of microelectric circuits are constantly exposed to complex low level radiation fields. Analysis and prediction of this upset phenomena is essential to ensuring the reliability and sustained operational ability of microelectric circuits in space. The extreme financial losses associated with the failure of space based systems are well known.

Reverse biased junctions are essential components of microelectronic circuits. It is known that various types of radiation induce single event upsets at these junctions. These include heavy ions, protons, neutrons, alphas, and gammas. The amount of charge which must be collected across the junction to upset the circuit element is called the critical charge. In order to predict the single event upset (SEU) rates in microelectronic circuits, it was necessary to first determine the dimensions of the sensitive volumes of the particular junctions. The sensitive volume is generally defined to be that region about the junction within which the charges generated by the traversing radiation particles are efficiently collected at the junction. For the conventional surface barrier type detector discussed above, the sensitive volume is virtually the entire slab of silicon within the detector.

An important advance in predicting SEU rates of microelectronic circuits involved the ability to effectively measure and/or confirm the sensitive volumes of the micron sized junctions in solid-state electronic components (e.g., semiconductors). For a complete discussion of this aspect of the art, see the scholarly article presented by P.J. McNulty at the IEEE Nuclear and Space Radiation Effects Conference in Reno, Nev., Jul. 16, 1990, entitled "Predicting Single Event Phenomena in Natural Space Environments."

In theory, the "perfect" solid-state detector would approximate the size of a single biological cell or p-n junction of a microelectronic circuit. In this case, the charge induced in the detector would necessarily be from the same type and amount of radiation which would cause damage to a biological cell or cause an upset in a p-n junction of that size in a microelectronic circuit. Hence, the relatively large junctions of prior art devices have generally failed to achieve such heretofore theoretically advantageous results.

SUMMARY OF THE INVENTION

It is a principal object of the present invention to provide improved dosimeter and corresponding methods, and is a more particular object to provide a microdosimetry device for qualitatively analyzing radiation in a complex radiation field.

A further object of this invention is to provide a radiation monitoring device for qualitatively and quantitatively analyzing a complex radiation field to provide a total dose and dose equivalent estimate.

Yet another object of the present invention is to provide a radiation detector utilizing a solid-state semiconductor device of parallel microstructure p-n junctions which approximate in size biological tissue cells.

It is also an object of the present invention to provide a method and apparatus for shielding a microstructure detector to simulate specific biological cells.

Still a further object of the present invention is to provide a radiation detector array of microstructure parallel p-n junctions capable of generating electrical impulses at varying voltage levels which are indicative of the radiation field make-up.

Still another object of this invention is to provide method and apparatus for analyzing an energy deposition summary from an array of parallel p-n junctions subjected to a complex radiation field for qualitatively determining the make-up of the incident radiation field.

And yet still another object of the present invention is to provide method and apparatus for summing the electric charges generated within an array of parallel p-n junctions in order to analyze the summation to determine the make-up of a radiation field.

A further object of the present invention is to provide a personal sized microdosimetry device capable of measuring the total dose and dose equivalent from an incident radiation field.

Still a further object of this invention is to provide an area dosimetry device capable of qualitatively monitoring for different types of radiation.

And yet another object of the present invention is to provide a microdosimetry device for qualitatively measuring the effects of radiation upon microelectronic circuits in a space or similar environment.

A further object of the present invention is to provide a portable microdosimetry device capable of being worn by an operator to directly provide an dose equivalent and total dose estimate in real time.

It is also an object of the present invention to provide an apparatus and method for storing an energy deposition spectrum of electrical charges generated in a detector array of p-n junctions for subsequent analysis by external analyzing computers.

Yet another object of the present invention is to provide apparatus and method to accurately predict the risk involved in exposing an organism or microelectronic circuit to some complex radiation environment.

Another object of this invention is to provide a relatively inexpensive solid-state dosimetry device utilizing conventional solid-state devices and capable of qualitatively and quantitatively analyzing an incident radiation field in terms of total dose, dose equivalent, and risk.

Still another object of the present invention is to provide a self-contained battery powered dosimetry device capable of accurately measuring and recording the pulse-height spectrum from a complex radiation field.

The present invention equally is concerned with improved methodology corresponding with the above-referenced devices.

Additional objects and advantages of the invention will be set forth in part in the description which follows, and in part will be apparent to one of ordinary skill in the art from the description, or may be learned by the practice of the invention. The objects and advantages of the invention may be realized and obtained by means of the instrumentalities and combinations particularly pointed out in the appended claims.

The present invention utilizes a detector array of highly concentrated microstructure parallel p-n junctions with each individual junction acting as a separate detector. The present invention approaches the "perfect" theoretical detector by utilizing a very high concentration of tiny microstructure detector units or individual p-n junctions. The method and apparatus of this invention provide for measuring the individual electrical impulses generated within the sensitive volume of each individual p-n junction. Different ionizing particles generate charges of varying degrees within the sensitive volumes. The present invention provides means and apparatus for measuring the charges occurring at various levels and providing a summation thereof. The total summations of the charges is thus indicative of the make-up of the radiation field and subsequent analysis thereof provides a qualitative dose equivalent estimate as well as a total quantitative dose. The detector unit of the present invention overcomes the drawbacks of the relatively large conventional detectors and provides an apparatus and method for accurately analyzing the constitute elements of a complex radiation field.

To achieve the objects and in accordance with the purposes of the invention, as embodied and broadly described herein, an exemplary apparatus of the present invention comprises a detector array of microstructure parallel p-n junctions, each p-n junction defining a predetermined sensitive volume within which a voltage pulse or electrical impulse is produced responsive to incident radiation; and circuitry means in communication with the detector array for generating digital pulse signals representative of the voltage pulses induced within the sensitive volumes responsive to the incident radiation, the energy deposition summation of the digital pulses over a period of time being in the form of, for example, a pulse height spectrum which is indicative of the make-up of the radiation field upon subsequent analysis.

In one preferred embodiment of the present invention, the detector array comprises a semiconductor device, and particularly a silicon crystal diode array of at least 32,000 parallel p-n junctions.

In still a further preferred embodiment of this invention, the detector array, and thus each sensitive volume, is shielded with varying shielding materials so that the particular p-n junctions are exposed to radiation similar to that which would be encountered within specific biological tissue.

The circuitry means of the present invention preferably comprises a preamplifier configured to receive a voltage pulse induced within the sensitive volume of each junction and generate a voltage pulse signal response thereto; a shaping amplifier in operative communication with the preamplifier for increasing the voltage pulse signal to a voltage level suitable for processing by an analog-to-digital converter; an analog-to-digital converter in operative communication with the shaping amplifier for converting the voltage pulse signal into a digital pulse signal; a microprocessor in operative communication with the analog-to-digital converter for reading and processing the digital pulse signals; and a memory array configured to receive and tally the digital pulse signals from the microprocessor according to their respective energies, a representation of the tally of the digital pulse signals according to their respective energies constituting a signature pulse height spectrum. This signature pulse height spectrum is subsequently analyzed to determine the make-up of the radiation field.

In another preferred embodiment of the present invention the microdosimetry device further comprises pulse height spectrum interpreting means in operative communication with the circuitry means for generating the pulse height spectrum from the tally of digital pulse signals and translating the pulse height spectrum into a radiation dose equivalent estimate. In another preferred embodiment of the invention, the pulse height spectrum interpreting means comprises a peripheral computer configured to be operatively mated with the microprocessor at selected intervals, the microprocessor sending to the peripheral computer the tally of digital pulse signals from the memory array. In an alternative embodiment of this invention, the dose equivalent computer comprises an integral computer in physical operative communication with the microprocessor, and display means for directly displaying the dose equivalent estimate from the microdosimetry device.

The pulse height spectrum interpreting means according to this invention preferably comprises means for applying sensitive volume dependent weighting factors to the energy deposition within discrete energy channels of the pulse height spectrum. These weighting factors correlate to known energies generated by known ionizing particles in sensitive volumes of comparable size to the sensitive volumes of the p-n junctions used in the detector array. Hence, an dose equivalent estimate is generated by applying, for example, with simple multiplication algorithms, these weighting factors to the energy deposition within the discrete channels of the pulse height spectrum.

In still another preferred embodiment of the present invention, the microdosimetry device further comprises total dose calculating means for estimating the total radiation dose from a complex radiation field. In a preferred embodiment, the total dose calculating means comprises a calibrated PMOS transistor having a varying turn-on voltage which varies in correspondence with the total radiation dosage to which the PMOS transistor has been exposed to; and total dose circuitry means in operative communication with the PMOS transistor for converting the varying turn-on voltage to a total dose estimate. In another preferred embodiment, the total dose circuitry means comprises a peripheral computer configured to be operatively mated with the PMOS transistor at selected intervals. In an alternative embodiment of this invention, the total dose calculating means may comprise an integral computing device for directly displaying the total dose estimate from the microdosimeter itself.

To further achieve the objects and in accordance with the invention, as embodied and broadly described herein, a portable radiation monitoring system for qualitatively predicting the dose equivalent from an incident complex radiation field is provided. The system comprises a semiconductor detector having microstructure parallel p-n junctions; circuitry means in operative communication with the detector for tallying electrical impulses generated within the premeasured sensitive volumes of the p-n junctions. The electrical impulses are tallied according to varying energy bands such that a summation of impulses occurring within each energy band over a period of time is generated; and dose equivalent analyzing means operatively mateable with the circuitry means for applying sensitive volume dependent weighting factors to the summations of electrical impulses, thereby generating an equivalent in dose estimate.

In a preferred embodiment of this invention, the radiation monitoring system is configured as a personal sized radiation dosimetry device.

In yet an alternative preferred embodiment, the radiation monitoring system is configured as an area monitor. In a preferred embodiment, the area monitor is configured for a space platform.

In still another preferred embodiment of the radiation monitoring system, total dose calculating means are further provided for estimating the total dose from an incident radiation field.

To further achieve the objects and in accordance with the purpose of the invention, as embodied and broadly described herein, there is provided a method for qualitatively analyzing the dose equivalent from a complex incident radiation field. The method comprises the steps of subjecting an array of microstructure parallel p-n detectors having associated predefined sensitive volumes to the radiation field; measuring and tallying according to energy levels digital pulse signals corresponding to voltage pulses or electrical impulses generated within the sensitive volume of each detector responsive to incident radiation, the tallying step providing a summation of digital pulse signals occurring within a particular energy band; and translating summations of digital pulses into an dose equivalent estimate.

In a preferred embodiment of the method of this invention, the subjecting step comprises subjecting a silicon crystal transistor to the radiation field. In a most preferred embodiment, silicon transistor is shielded with appropriate shielding so that the array of microstructure detectors simulates specific biological tissue.

The translating step preferably comprises applying predetermined sensitive volume dependent weighting factors to the summations of digital pulse signals falling within discrete energy channels. The weighting factors qualitatively correlate the energy deposition within an energy channel to known energies generated by known ionizing particles in sensitive volumes of size comparable to those of the junctions in the detector array of the present invention. In another preferred embodiment, the translating step further comprises sending the summations of pulse signals to a peripheral computer which subsequently applies the predetermined weighting factors to the summation of digital pulse signals thereby yielding an dose equivalent estimate.

The method according to the present invention may preferably comprise the additional step of calculating a total dose estimate from the complex radiation field. The total dose calculating step may comprise subjecting a calibrated PMOS transistor to the radiation field, the transistor having a varying turn-on voltage which varies according to the total radiation dose the PMOS transistor has been exposed to; measuring the turn-on voltage of the PMOS transistor which is representative of the total radiation dose; and translating the turn-on voltage into a total dose estimate.

The accompanying drawings, which are incorporated in and constitute a part of the specification, demonstrate embodiments of the invention and taken together with the description, serve to help explain the principles of the invention.

BRIEF DESCRIPTION OF THE DRAWINGS

A full and enabling disclosure of the present invention, including the best mode thereof, to one of ordinary skill in the art is set forth more particularly in the remainder of the specification, including reference to the accompanying figures, in which:

FIG. 1 illustrates a perspective view of an exemplary embodiment of the present invention used particularly as a personal radiation dosimetry device;

FIG. 2 is an enlarged view of the embodiment of the present invention shown in FIG. 1;

Figure 3:
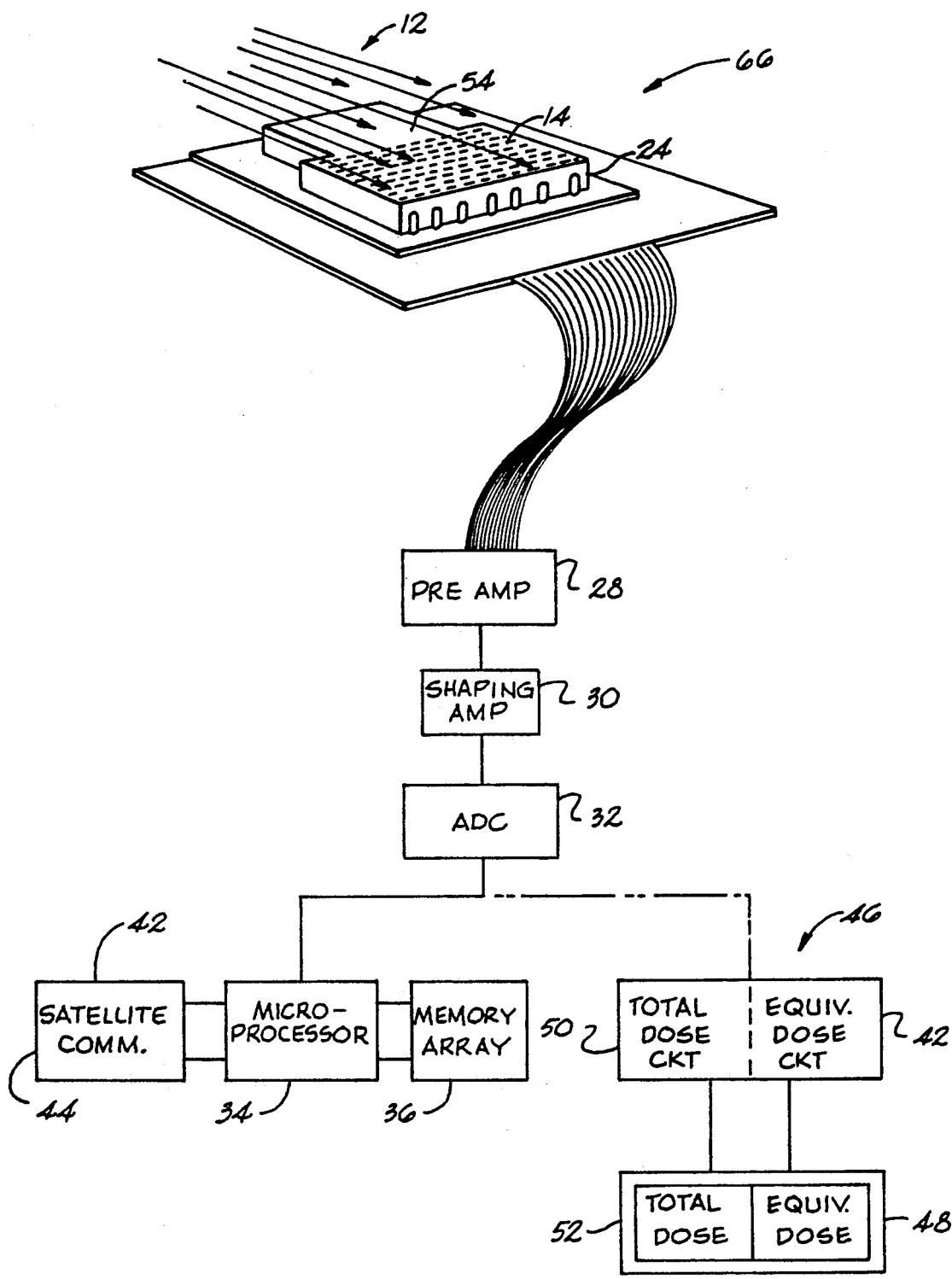
FIG. 3 is a perspective and diagrammatic view of a preferred embodiment of the present invention depicting the detector portion thereof perspectively and the circuitry and analyzing means thereof schematically.

Repeat use of reference characters in the following specification and appended drawings is intended to represent the same or analogous features or elements of the present invention.

DETAILED DESCRIPTION OF THE PREFERRED EMBODIMENTS

Reference will now be made in detail to the present preferred embodiments of the invention, examples of which are illustrated in the accompanying drawings. The following disclosure is for purposes of example only, and is not intended to limit broader aspects of the invention embodied thereby.

The apparatus and method of the present invention pertain generally to radiation monitoring systems, devices, and the like. Although the following description and appended figures refer to the invention generally in terms of a personal radiation dosimetry device, this is not meant as a limitation upon the present invention. For example, the method and apparatus of this invention are just as relevant to radiation monitoring systems and devices utilized as area monitors, such as area monitors in a radiation work area. The present invention also pertains to monitors for space platforms such as the space shuttle. Measuring and predicting the effects of low level radiation in any environment are within the spirit and scope of the present invention. It should be understood that the invention is generally referred to as a dosimetry device for ease of illustration only and is not a limitation upon the invention. The apparatus and method of this invention pertain to any use in which a qualitative analysis of a radiation field is desired.

A microdosimetry device for qualitatively analyzing radiation in a complex radiation field incident thereon is provided. As depicted in FIGS. 1 and 2, microdosimetry device 10 of the present invention may comprise a personal dosimetry device 60 compact and portable enough for an operator to wear, for instance attached to his belt, as graphically illustrated in FIG. 2. Using modern lithographic techniques and suitable packaging, the size of the device may be reduced even further to, for example, the size of a film badge.

Microdosimetry device 10 and radiation monitoring system 66 (FIG. 3) for qualitatively analyzing incident radiation comprises an array of microstructure parallel p-n junctions. As embodied herein and shown for example in FIGS. 3 and 4, detector array 14 comprises a relatively large concentration of parallel p-n junctions 16. Each p-n junction 16 further defines a predetermined sensitive volume 20 within which an electrical impulse or voltage pulse is produced responsive to incident radiation. This principle will be explained in greater detail below.

Microdosimetry device 10 and system 66 of the present invention further comprise circuitry means in communication with detector array 14 for generating digital pulse signals representative of the voltage or electrical pulses induced within sensitive volumes 20 of p-n junctions 16. As displayed in FIG. 6, a representation of energy deposition summations 64 of the digital pulses generated over a period of time provides a radiation signature pulse height spectrum 22 which is indicative of the makeup of the radiation field upon subsequent analysis thereof.

The principle of charge generation in a microelectronic junction responsive to incident radiation is an understood principle and will be understood by one of ordinary skill in the art, and accordingly, need be discussed only briefly here.

Figure 4:
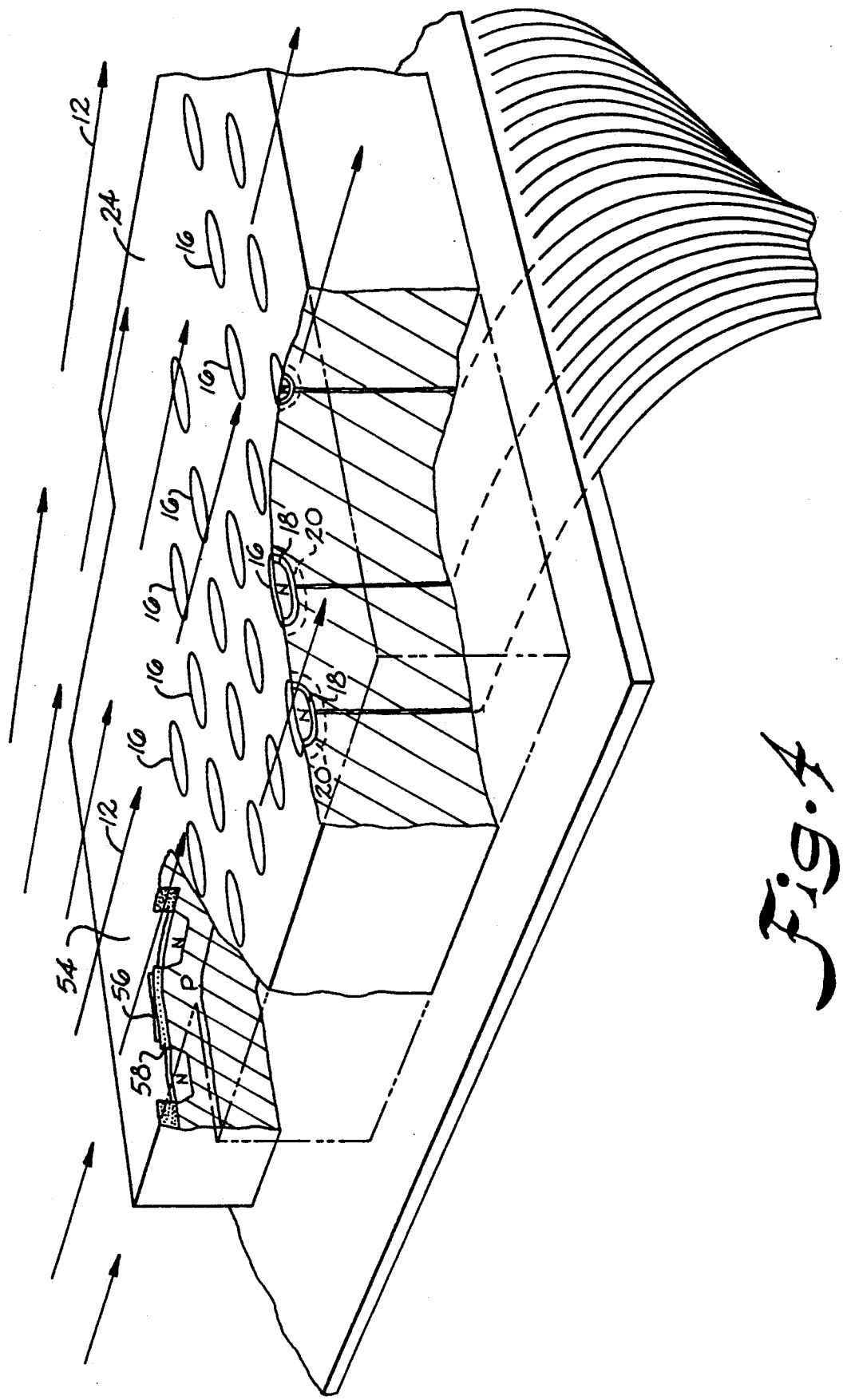
FIG. 4 is an enlarged perspective view of the detector array illustrated in FIG. 3 with partial cutaway.

The basis for the operation for solid-state p-n junctions, such as silicon or germanium transistors, is the interface between regions of the crystal device which have different doping characteristics. Referring to FIG. 4, a depletion region 18 consisting of layers of positive and negative charges appears on opposite sides of junction 16 between the material of differing doping characteristics. Strong electric fields connect the charges on either side with the direction of the field lines oriented perpendicular to the junction. In the absence of any external disturbance, this electric field does not extend beyond depletion region 18. Charges generated as electron/hole pairs within depletion region 18 or individual charges wandering into depletion region 18 are accelerated under the force of this electric field with electrons and holes attracted to opposite sides. This flow of current across junction 16 results in a measurable decrease in the voltage difference across the junction. This voltage swing is the basis of the operation of solid-state silicon and germanium particle detectors.

When an ionizing radiation particle, such as an alpha particle or neutron, traverses these p-n junctions, an electrical charge is generated therein. The passing ionizing particle generates numerous electrons and holes along its trajectory through the junction. The electrons and holes are accelerated under the force of the electric field existing at the junction and attracted to opposite sides thereof. Thus the voltage difference across the junction is subject to be changed as a result of an incident ionizing radiation particle.

The charge collected at these junctions is generally equivalent to the energy deposited by the ionizing particle through the junction. The equivalency between charge collected and energy deposited is based on the fact that, for most particles, the number of electron/hole pairs generated along the path of an ionizing particle is proportional to the energy deposited along the trajectory. Different ionizing radiation particles possess different particular energies and thus deposit "signature" energies in the junctions upon traversal thereof. The charge collected at the junctions as a result of this energy deposition generally equals the energy of the incident particle. Thus, by measuring the charge collected across the junction, the energy deposite by the incident particle is determined. In this manner, the constituent components of an incident complex radiation field can be determined by measuring and summing the various electrical charges generated across these junctions.

For instance, the energy deposition of 4.8 MeV alphas incident upon a particular detector can be measured and recorded. Similarly, the same information can be obtained by exposing a detector to ionizing particles of known type and energy. Subsequently, when the detector is subjected to a complex radiation field of unknown particles, the energy deposited within the junctions can be measured and compared to the known energies from known ionizing particles, thus providing an estimated dose equivalent from the unknown complex radiation field.

The sensitive volume of a p-n junction is defined to be that region of the silicon within which the charge generated by the traversing radiation particles, or by reactions at or near the junction which generate secondary particles (some of which traverse the junction), are efficiently collected at the junction. The surface area (portion of the sensitive volume exposed to the incident radiation particles) of the sensitive volume is essentially that of the junction itself. The thickness (or depth) of the sensitive volume for some technologies, such as certain forms of silicon-on-insulator (SOI), is essentially that of an identifiable microstructure. For other technologies, such as bulk silicon, the sensitive volume must be determined. This can be done, for example, by measuring the amount of charge collected across the junction according to the method explained by the McNulty scholarly paper cited above. For a fully depleted silicon detector, the sensitive volume is essentially the entire junction.

For a junction type to be useful in a microdosimetry application, the energy deposited therein from ionizing particles should be relatively insensitive to the angle of incidence of the particles. The preferred approach is to fashion the sensitive volume as nearly in the shape of a cube as possible but with rounded corners, or as cylindrical discs. Accordingly, an array of diodes in an isolation technology having well defined sensitive volumes and being relatively insensitive to incident angles may be preferred. For certain junctions, the charge collected is proportional to the product of the particle's linear energy transfer (LET), which represents the energy deposited or electron pairs generated per unit of path length, and the secant of its angle of incidence up to 70 degrees with respect to normal.

To qualitatively analyze the energy deposition from an incident radiation field upon an array of microstructure p-n junctions, the dimensions of the sensitive volume of the junction must first be determined. For a single p-n junction to operate as a radiation detector, the associated sensitive volume of the junction should preferably have dimensions such that the total charge generated within the volume equals the charge collected across the junction. Hence, in a preferred embodiment, a fully depleted or biased junction would be used, but this is not a necessity. Any type of junction (e.g., partially depleted, as one alternative) could be used as a detector as long as the sensitive volume of that junction can be determined to within a sufficient accuracy.

The detector array of the present invention preferably comprises a semiconductor device. As embodied herein and shown for example in FIGS. 3 and 4, detector array 14 preferably comprises semiconductor device 24, such as a commercially available silicon integrated circuit or similar device. Any combination of commercially available microelectronic devices may be employed as detector array 14.

Semiconductor 24 comprises a relatively high concentration of parallel p-n junctions 16, such as preferably in excess of 32,000 junctions. Detector array 14 utilizes a far greater number of junctions 16 than was generally considered possible in the art and reduces ambiguity as to what type of radiation generated the charge, as exists with use of the large conventional solid-state detectors. An example of a preferred embodiment of array 14 according to this invention would be a commercially available static random access memory chip (SRAM) of at least 32,000 parallel p-n junctions.

Each junction 16 has an associated well defined sensitive volume 20. Sensitive volume 20 can generally be considered one of two types, equivalent or designed. An equivalent sensitive volume is one that, in essence, must be measured, for example, in proportion to the charge collected therein, as just discussed. Alternatively, sensitive volume 20 may preferably be a design sensitive volume. Design sensitive volumes are those designed and manufactured into the chip with the dimensions thereof already being known. An example of this type of chip is the silicon oxide trench bonded wafer chip available from Texas Instruments. With this type of chip, the manufacturer provides known sensitive volume dimensions.

Figure 5:
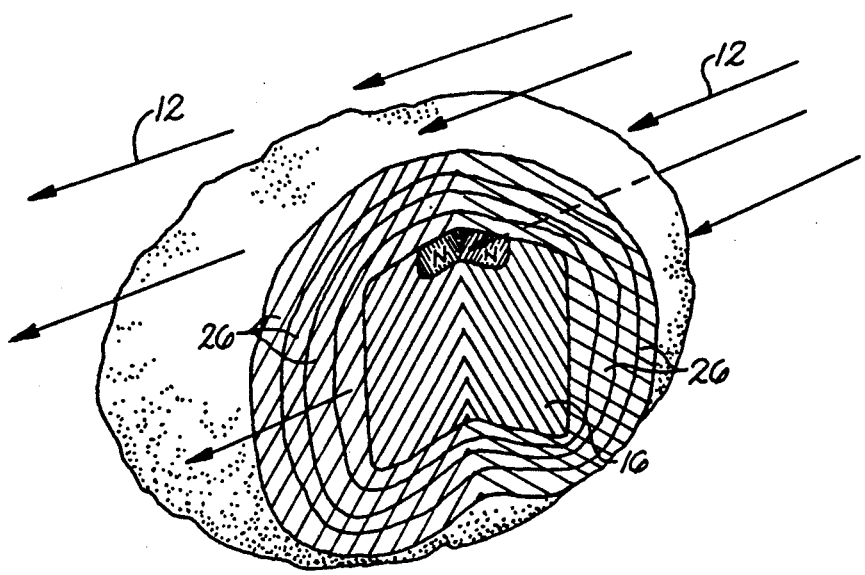
FIG. 5 is a perspective cut-a-way view of an individual p-n junction detector in accordance with this invention illustrating shielding thereof for electrical isolation or to simulate specific biological tissue.

In one preferred embodiment of the present invention as illustrated in FIG. 5, junction 16 is shielded with varying types and degrees of shielding material 26, such as tissue equivalent plastic, so that the charge collected at junction 16 simulates that collected within specific biological tissue. As depicted in FIG. 5, individual junction 16 may be itself surrounded by shielding material 26. In an alternative embodiment, entire detector array 14 may be shielded by shielding material 26 instead of each individual junction 16 being shielded.

In another preferred embodiment, junction 16 may be shielded with suitable material for electrically isolating the junction.

Shielding material 26 may also be utilized to simulate the environment within which it is desired to qualitatively analyze a radiation field. Shielding material 26 can also be utilized to customize array 24 to represent any number of operating environments or to simulate any type of biological tissue. For example, alpha particles from naturally occurring radioactive nuclei have relatively high energies but due to their relatively short range have very little penetrating distance. Thus alpha particles cannot penetrate a worker's skin but could cause significant damage if inhaled into the lung or swallowed into the stomach. Thus, to simulate an internal organ being subjected to an incident alpha, junction 16 would be heavily shielded with tissue equivalent shielding material 26. Likewise, to simulate a cornea of an eye being subjected to an incident alpha, junction 16 would be relatively unshielded.

It should be noted that the biological hazard from radon is due to alpha emission from radioactive radon daughters that attach themselves to small dust particles which might be inhaled. Microdosimetry device 10 is ideally suited to distinguish traversals by alphas emitted from nearby radon daughters or other types of ionizing radiation. Any variety of techniques may be employed to trap dust particles in the air in such a manner so as to allow alphas from radon daughters to reach detector array 14.

In a preferred embodiment of apparatus 10 and system 66 according to the present invention as depicted in FIG. 3, the circuitry means comprises a preamplifier 28 configured to receive a voltage or electrical pulse induced within sensitive volume 20 responsive to an incident radiation particle. Preamplifier 28 receives the electrical impulse or voltage pulse and generates a voltage pulse signal. Shaping amplifier 30 in operative communication with preamplifier 28 is provided for increasing the signal from preamplifier 28 to a voltage range suitable for processing by an analog-to-digital converter. Analog-to-digital converter 32 is provided in operative communication with shaping amplifier 30 for converting the voltage pulse signal into digital form. Microprocessor 34 is provided in operative communication with analog-to-digital converter 32 for reading and processing the digital pulse signals.

The circuitry means of this invention includes any suitable method for obtaining a pulse height spectrum. For example, methods are known for generating a pulse height spectrum without an analog-to-digital convertor. These methods are within the scope of the circuitry means of the present invention.

Microprocessor 34 acts, in essence, as a routing mechanism routing the pulse signals to a memory array or subsequently from the memory array to an external computer. In one preferred embodiment of this invention not shown in the Figures, a conventional buffer is provided between analog-to-digital converter 32 and microprocessor 34.

Preamplifier 28, shaping amplifier 30, analog-to-digital converter 32, and microprocessor 34 generally constitute conventional components and any combination of like devices to carry out the functions described is within the scope of this invention. One of ordinary skill in the computer sciences would understand how to customize or modify these components to perform the desired task.

In a preferred embodiment of the circuitry means of the present invention as illustrated in FIG. 3, a memory array 36 is provided to store the digital pulses from microprocessor 34. Memory array 36 is configured to receive and tally the digital pulse signals from microprocessor 34 according to their respective energies. In other words, a tally of pulses occurring at similar energy levels is generated.

Tally capacities may vary from zero to well over four billion counts per channel in a typical system, with memory array 36 being modified accordingly to adapt to the desired resolutions and tally capacity. A conventional 8-bit, 10-bit, or 12-bit memory system may be utilized as memory array 36. In a typical 8-bit memory system employed as memory array 36, the system maximum count capacity may be increased by enhancing the memory to 3 bytes per channel. Thus in an 8-bit system, 768 bytes would be provided with bytes 0 to 255 representing the least significant byte, bytes 256 through 511 representing the middle byte, and bytes 512 through 767 representing the third or most significant byte. The configuration is similar for a 10-bit and 12-bit system.

Using an 8-bit system as an example of memory array 36, channels 0 through 255 would represent discrete energy bands into which the digital pulses would be routed according to their respective energies. For example, each may represent an incremental amount of energy, for example, 0.2 MeV. A digital pulse having a magnitude of 1.0 MeV would be routed by microprocessor 34 into the channel representing 0.8 MeV to 1.0 MeV. Subsequently, every time an additional pulse is routed to that channel, the register for that channel will increase by one. When the least significant byte is full, then counts will be routed to the middle byte for the channel and so forth until the third byte for that channel is full. With this arrangement utilizing three bytes per channel, each channel may register up to over 16 million counts. For instance, the counts of pulses at the energy level corresponding to channel 1 will equal the counts in memory location channel 1 plus 256 times the counts in memory location channel 257 plus 65,536 times the counts in memory location 513. Hence, with this configuration the counts of pulses at any energy band corresponding to memory map channel would be counts:

(channel n)=ML (o+n)+256 * ML (256+n)+ 65,536 * ML (512+n); wherein ML(O)=counts in memory location O.

Figure 6:
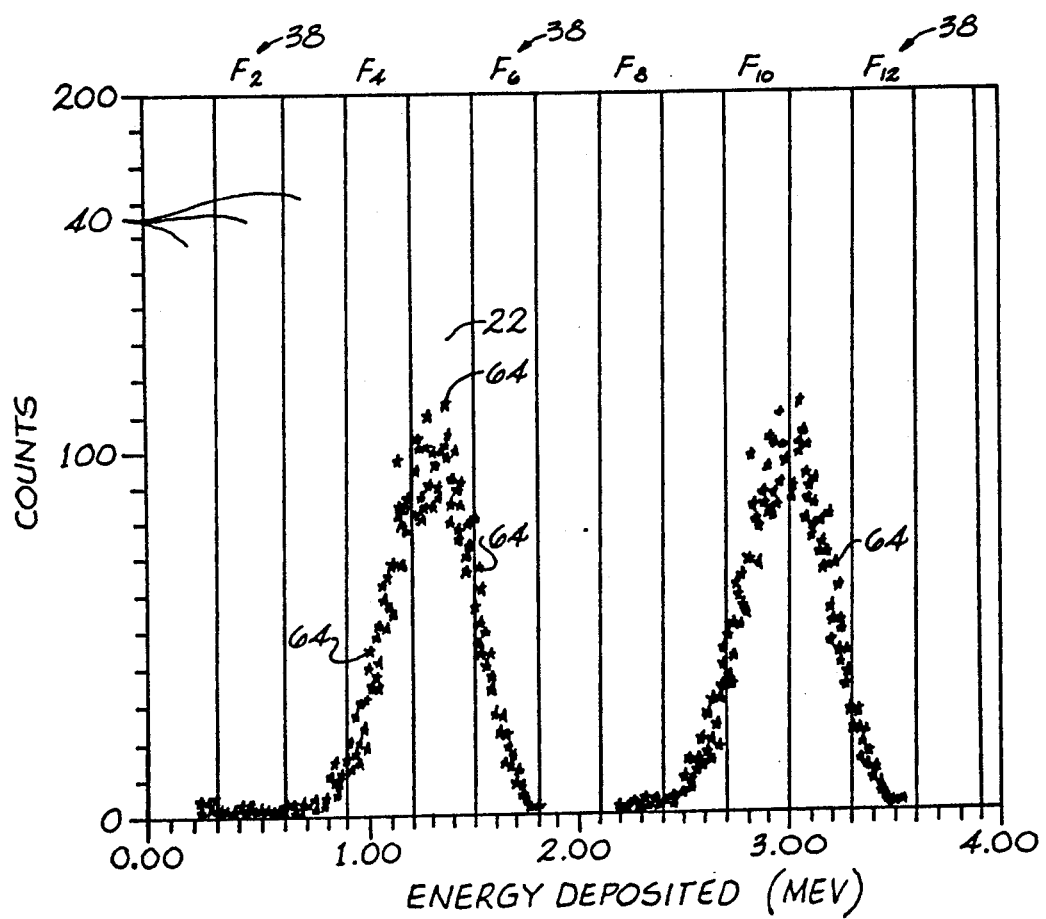
FIG. 6 is a representation of a pulse height spectrum partitioned into discrete energy channels having assigned weighting factors in accordance with the present invention.

Memory array 36 does not store each individual pulse, but in essence maintains a running tally of the pulses occurring within a particular energy band. Memory array 36 thus stores an energy deposition summation 64 of the digital pulses generated over a period of time within a given energy level. Displayed on a graph of counts verses energy deposited, energy deposition summations 64 take the form of pulse height spectrum 22, as depicted in FIG. 6. Pulse height spectrum 64 is thus a representation of the total energy deposition from an incident radiation field, and by comparing this energy deposition spectrum to known energies generated in comparable sensitive volumes by known ionizing particles, a qualitative dose estimate is provided. Pulse height spectrum 22 is thus, in essence, a signature of the radiation field which produced it and subsequent analysis thereof reveals the constituent ionizing particles comprising the complex radiation field.

Preferably, apparatus 10 of the present invention also includes pulse height spectrum interpreting means in operative communication with microprocessor 34 for generating pulse height spectrum 22 from the tally or summations 64 of digital pulse signals. The pulse height spectrum interpreting means then translates pulse height spectrum 22 into a radiation dose equivalent estimate or other suitable estimate of risk. In this respect, pulse height spectrum interpreting means may also be referred to as dose equivalent analyzing means.

In the preferred embodiment of the present invention as depicted in FIG. 3, the pulse height spectrum interpreting means comprises dose equivalent computer 42. In a most preferred embodiment, dose equivalent computer 42 is peripheral computer 44 which is configured to be operatively mated with microprocessor 34 at selected intervals. Microprocessor 34 would then route the tally or summation 64 of digital pulse signals from memory array 36 to computer 44. In a preferred embodiment of the present invention wherein apparatus 10 is employed as a area monitor, for example, in a space station, a space platform, or a nuclear reactor, external peripheral computer 44 may comprise a satellite or other type of remote computer. In that instance, microprocessor 34 could be operatively mated with the satellite computer through appropriate linking means. In a preferred embodiment depicted in FIGS. 1 and 2, wherein apparatus 10 is employed as a personal dosimetry device 60, peripheral computer 44 could comprise any external computer configured to mate with dosimetry device 60 through microprocessor 34.

It is preferred that the dose equivalent computer 42 comprise an external peripheral computer 44 for ease in changing or modifying the translating parameters used to translate pulse height spectrum 22 or summations 64 of pulse height signals to an dose equivalent estimate. In this embodiment, the modifications would be done through the software of computer 44 without requiring modification of any type to detector array 14 or the circuitry means.

In another alternative preferred embodiment of the dosimetry device 10 as depicted in FIG. 3 by the dashed lines, dose equivalent computer 42 may comprise a component of integral computer 46 in physical operative communication with microprocessor 34. In this embodiment integral computer 46 further comprises dose equivalent display means 48 for directly displaying the dose equivalent estimate. With this embodiment, any desired modifications to the translation algorithms can be done by applicable software. This alternative preferred embodiment is also illustrated in FIGS. 1 and 2.

Dose equivalent computer 42, whether in the form of peripheral computer 44 or integral computer 46, comprises means for applying sensitive volume dependent weighting factors to discrete energy channels of pulse height spectrum 22 or other forms of energy deposition summation display. This principle is depicted in FIG. 6. Using peripheral computer 44 as an example of dose equivalent analyzing means, pulse height spectrum 22 is divided or partitioned into discrete energy channels 40, with each channel 40 representing a distinct energy band. Energy channels 40 may, but need not, correspond to the energy bands of memory array 36 discussed previously. Weighting factors 38 are assigned to each specific energy channel 40. Weighting factors 38 correlate to known energies generated by known ionizing particles in sensitive volumes comparable in size to sensitive volumes 20 of junctions 16 of array 14.

Weighting factors 38 are applied to summations 64 of the digital pulses falling within the channel 40 associated with that particular weighting factor 38 through a simple multiplication algorithm. For example, referring to FIG. 6, summations 64 of pulses falling between 0.9 MeV and 1.2 MeV are multiplied by weighting factor $F_4$. In a preferred embodiment; energy channels 40 directly correspond to the energy bands of memory array 36 and weighting factors 38 may be applied directly to the pulses stored in memory array 36 by integral computer 46. The concept of applying weighting factors 38 to discrete energies of a summation of digital pulses generated in a detector array are not new to this invention. For instance, the principle of assigning weighting factors is discussed in the article "Quality Factor in Radiation Protection," ICRU Report No. 40, published in 1986, by the International Commission on Radiation Units.

Weighting factors 38 are sensitive volume dependent. A specific set of weighting factors applies to a given specific volume 20 and varying specific volumes 20 have varying sets of weighting factors 38. For example, the weighting factor for the 1.0 to 1.3 MeV energy channel for a 1 micron sensitive volume would not necessarily equal the weighting factor for a 1.0 to 1.3 MeV energy channel for a 0.5 micron particle detector. Thus to apply the known body of data comprising weighting factors 38 to correlate measured energy deposition to known energy depositions of known ionizing particles, sensitive volumes 20 must be accurately measured or otherwise provided.

As the existing body of weighting factors 38 pertain to generally much larger sensitive volumes, for example, the 25 $mm^2 \times 100$ um volume of the conventional silicon barrier detector, this known body of weighting factors 38 must be proportionally reduced to correlate to the much smaller sensitive volumes 20 of junctions 16 of this invention. Simple reduction algorithms may be utilized to down-scale weighting factors 38 to a corresponding value for sensitive volumes 20 of detector array 14. Preferably, down-scaled weighting factors 38 have been computed and stored in dose equivalent computer 42 prior to utilization of microdosimetry device apparatus 10 of the present invention.

As stated above, a preferred embodiment of dose equivalent computer 42 is peripheral computer 44 which is operatively mated with microprocessor 34. In this arrangement, weighting factors 38 can be changed or modified in any way to vary the resulting dose equivalent estimate by simply changing factors 38 within peripheral computer 44. In the alternative embodiment of this invention wherein equivalent those computer 42 comprises integral computer 46, each individual dosimeter device would need to be modified. This could be done by software or by changing a ROM device. Peripheral computer 44 is preferably mateable with any number of detector arrays 14 and associated circuitry means. Thus any one of these arrays would be effectively modified by changing the variables (i.e., weighting factors 38) within peripheral computer 44.

In a further preferred alternative embodiment of the present invention, the microdosimetry device or radiation monitoring system for qualitatively predicting the dose equivalent from an incident complex radiation field further comprises total dose calculating means for estimating the total radiation dose from a complex radiation field. As embodied herein and shown for example in FIGS. 3 and 4, the total dose calculating means may comprise a calibrated PMOS transistor 54. The use of a PMOS transistor as a total dose radiation detector is known and understood by those skilled in the art. See, for example, the procedures outlined by A. Holmes-Sidele and L. Adams, *Radiation Phys. Chem.*, Volume 28, page 235 (1986). Briefly though, PMOS transistor 54 has a varying turn-on voltage which varies in correspondence with the total radiation dosage to which PMOS transistor 54 has been exposed to. Referring to FIG. 4 in particular, the gate bias required to turn on or turn off PMOS transistor 54 is monitored. Changes in the turn-on voltage is the dominant failure mode for the device exposed to ionizing radiation at low and moderate dose rates. This is principly the result of the build up of positive charge in the thin gate oxide layer 58 under gate 56.

As illustrated in FIG. 3, the total dose calculating means further comprises total dose circuitry 50 in operative communication with PMOS transistor 54 for converting the varying turn-on voltage from PMOS transistor 54 to a total dose estimate. In a preferred embodiment depicted in FIG. 3 by the dashed lines to integral computer 46, total dose circuitry 50 may be contained within integral computer 46 to compute the total dose estimate directly. In this embodiment, total dose display means 52 are also included to directly display the total dose estimate. In this embodiment, integral computer 46 would contain both total dose calculating means 50 and dose equivalent computer 42.

In the preferred embodiment of the invention, total dose circuitry means 50 comprises a peripheral computer configured to be operatively mated with PMOS transistor 54 at selected intervals. Preferably, the peripheral computer comprises peripheral computer 44 utilized as dose equivalent computer 42. With this arrangement, peripheral computer 44 would convert turn-on voltage from PMOS transistor 54 into a total dose estimate at essentially the same time it translates pulse height spectrum 22 into an dose equivalent estimate It is preferred to include total dose calculating means within radiation monitoring system 66 instead of simply summing the component parts of the dose equivalent estimate generated by the dose equivalent analyzing means. This embodiment is preferred since the circuitry means for generating and recording the digital pulse signals from junctions 16 and the pulse height interpreting means are generally not as effective as PMS transistor 54 and associated total dose circuitry means 50 at detecting radiation events occurring at the very low end of the energy spectrum. A summation of the component elements of the dose equivalent estimate might not include the energy deposition at the very extreme low end of the energy spectrum, although this would provide a fairly accurate total dose estimate. Hence, the total dose calculating means are included to account for these very low energy radiation events. The PMOS transistor can also be surrounded by tissue equivalent shielding material.

In further accordance with the objects of the present invention, a method for qualitatively analyzing the dose equivalent from a complex incident radiation field is provided. The method comprises the first step of subjecting an array of microstructure parallel p-n detectors having associated predefined sensitive volumes to a complex radiation field. Preferably, this step includes subjecting a silicon crystal transistor to the radiation field.

In further accordance with the method of the present invention, included is the step of measuring and tallying according to energy levels digital pulse signals corresponding to voltage pulses generated within the sensitive volume of each detector. The voltage pulses are responsive to incident radiation and the tallying step provides a summation of the digital pulses occurring within a particular energy band.

In a preferred embodiment of the method of this invention, the measuring and tallying step further comprises sending to a preamplifier a voltage pulse induced within the sensitive volume from incident ionizing particles; increasing the preamplifier output signal with a shaping amplifier; converting the shaping amplifier output signal into a digital pulse signal, for example, with an analog-to-digital converter; processing and routing the digital pulse signals from all of the p-n junctions within the detector with a microprocessor to a memory array configured to receive and sum the digital pulse signals according to their energy levels so that a summation of digital pulse signals occurring within a particular energy band is generated; and then storing the summations of digital pulse signals in a memory array for subsequent analysis.

In further accordance with the present method, a translating step is included to generate a dose equivalent estimate from the summations of digital pulses. The translating step may further comprise the process of applying predetermined sensitive volume dependent weighting factors to the summations of digital pulse signals falling within discrete energy channels. These weighting factors qualitatively correlate the energy deposition within a given energy channel to known energies generated by known ionizing particles in sensitive volumes comparable to those of the junctions used in the detector array. In one embodiment of the present method, the weighting factors are applied to the digital pulses prior to the pulses being stored in the memory array. In this embodiment, the stored pulses need only be subsequently covered into a readable dose equivalent estimate.

In the preferred embodiment of the present method, the translating step further comprises interfacing with a peripheral computer at selected intervals for transferring the summation of pulse signals thereto so that the peripheral computer can apply the predetermined sensitive volume weighting factors to the summation of digital pulse signals. The process of applying the weighting factors to the energy deposition within a given energy channel is accomplished through simple multiplication algorithms.

In another preferred embodiment of the present method, the translating step may also include sending the summations of pulse signals to an integral computer which directly applies to the predetermined sense of evaluating factors to the summations of digital pulse signals and directly displays the equivalent based estimate.

The actual translating process performed by either the peripheral computer or integral computer preferably comprises forming the summations of digital pulse signals occurring within particular energy bands over a period of time into a representative pulse height spectrum and partitioning the pulse height spectrum into discrete energy channels to which the sensitive volume dependent weighting factors are applied through appropriate multiplication algorithms.

In further accordance with the present invention, the method may also include the step of calculating a total dose from an incident radiation field. Preferably, this step comprises subjecting a calibrated PMOS transistor to the radiation field, the PMOS transistor having a varying turn-on voltage which varies according to the total radiation dose the PMOS transistor has been exposed to; measuring the turn-on voltage of the PMOS transistor; and translating the turn-on voltage into a total dose estimate.

It will be apparent to those skilled in the art that various modifications and variations can be made in the apparatus and method of the present invention without departing from the scope or spirit of the invention. For example, the summations of digital pulse height signals occurring at particular energies need not be represented in the form of a pulse height spectrum in particular, but may be represented in any useful form to which the sensitive volume dependent weighting factors could be effectively applied. Thus it is intended that the present invention cover modifications and variations of this invention as would be apparent to those of ordinary skill in the art, as would come within the scope of the appended claims and their equivalents.

What is claimed is:

1. A microdosimetry device for qualitatively analyzing radiation incident thereon in a complex radiation field, comprising:
    a detector array of microstructure parallel p-n junctions, each said p-n junction defining a predetermined sensitive volume within which a voltage pulse is produced responsive to incident radiation; and
    circuitry means in communication with said detector array for generating digital pulse signals representative of the voltage pulses induced within said sensitive volumes responsive to incident radiation, said circuitry means also providing summations of the digital pulse signals occurring at particular energies over a period of time; said circuitry means translating said respective summations into a radiation dose equivalent estimate.

2. A microdosimetry device as in claim 1, wherein said detector array comprises a semiconductor device.

3. A microdosimetry device as in claim 2, wherein said semiconductor device comprises a silicon crystal transistor.

4. A microdosimetry device as in claim 2, wherein said semiconductor device comprises a commercially available static random access memory chip.

5. A microdosimetry device as in claim 1, wherein said predetermined sensitive volumes further include shielding so as to simulate specific biological tissue.

6. A microdosimetry device as in claim 1 wherein said circuitry means comprises:
    a preamplifier configured to receive a voltage pulse induced within said sensitive volume from the incident radiation field and generate a voltage pulse signal;
    a shaping amplifier in operative communication with said preamplifier for increasing the voltage pulse signal to a voltage range suitable for processing by an analog-to-digital converter;
    an analog-to-digital converter in operative communication with said shaping amplifier for converting the voltage pulse signals into corresponding digital pulse signal images;
    a microprocessor in operative communication with said analog-to-digital converter for reading and processing the digital pulse signals; and
    a memory array configured to receive and tally the digital pulse signals from said microprocessor according to their respective energies, a representation of all tallies of the digital pulse signals according to their respective energies composing a signature pulse height spectrum.

7. A microdosimetry device as in claim 6, further comprising pulse height spectrum interpreting means in operative communication with said memory array for translating said pulse height spectrum into a radiation dose equivalent estimate.

8. A microdosimetry device as in claim 7, wherein said pulse height spectrum interpreting means further comprises means for applying sensitive volume dependent weighting factors to the pulse height spectrum according to discrete energy channels, said weighting factors correlating to known energies generated by known ionizing particles in sensitive volumes comparable to said sensitive volumes of said p-n junctions so that a dose equivalent estimate is generated.

9. A microdosimetry device as in claim 8, wherein said pulse height spectrum interpreting means comprises a dose equivalent computer.

10. A microdosimetry device as in claim 9, wherein said dose equivalent computer comprises a peripheral computer configured to be operatively mated with said microprocessor at selected intervals, said microprocessor sending to said peripheral computer the tally of digital pulse signals from said memory array.

11. A microdosimetry device as in claim 9, wherein said dose equivalent computer comprises an integral computer in physical operative communication with said microprocessor, and display means for displaying the dose equivalent estimate.

12. A microdosimetry device as in claim 1, further comprising total dose calculating means for estimating the total radiation dose from a complex radiation field.

13. A microdosimetry device as in claim 12, wherein said total dose calculating means comprises:
    a calibrated PMOS transistor having a varying turn-on voltage which varies in correspondence with the total radiation dosage to which said PMOS transistor has been exposed; and
    total dose circuitry means in operative communication with said PMOS transistor for converting the varying turnon voltage to a total dose estimate.

14. A microdosimetry device as in claim 13, wherein said total dose circuitry means are carried integral with said device, and further comprising total dose display means for displaying the total dose estimate directly from said device.

15. A microdosimetry device as in claim 13, wherein said total dose circuitry means comprises a peripheral computer configured to be operatively mated with said PMOS transistor at selected intervals.

16. A radiation monitoring system for qualitatively predicting the dose equivalent from an incident complex radiation field, comprising;
   a semiconductor detector having microstructure parallel p-n junctions, each said p-n junction defining a predetermined sensitive volume which is sensitive to radiation incident thereon such that electrical impulses of varying degrees are generated within said sensitive volume upon traversal thereof by radiation particles;
   circuitry means in operative communication with said semiconductor detector for tallying the electrical impulses falling within varying energy bands such that a summation of impulses occurring within each energy band over a period of time is generated; and
   dose equivalent analyzing means operatively mateable with said circuitry means for applying sensitive volume dependent weighting factors to the summations of electrical impulses, said weighting factors correlating to known energies generated by known radiation particles in sensitive volumes comparable to said sensitive volumes of said p-n junctions so that an dose equivalent estimate is generated by said dose equivalent analyzing means.

17. A radiation monitoring system as in claim 16, wherein said system is configured as a personal sized radiation dosimetry device 18. A radiation monitoring system as in claim 16, wherein said system is configured as an area monitor.

19. A radiation monitoring system as in claim 18, wherein said system is configured as an area monitor for a space platform.

20. A radiation monitoring system as in claim 16, wherein said circuitry means comprises:
   a preamplifier configured to receive the electrical impulse induced within said sensitive volume responsive to incident radiation;
   a shaping amplifier in operative communication with said preamplifier for increasing the electrical impulse to a range suitable for processing by an analog-to-digital converter; and
   an analog-to-digital converter in operative communication with said shaping amplifier for converting the electrical impulse into corresponding digital pulse signals;
   a microprocessor in operative communication with said analog-to-digital converter for reading and processing the digital pulse signals according to their respective energy levels; and
   a memory array configured to receive and sum the digital pulse signals from said microprocessor according to their energy levels so that a summation of digital pulse signals occurring within particular energy bands is generated.

21. A radiation monitoring system as in claim 16, wherein said dose equivalent analyzing means comprises a peripheral computer configured to be operatively mated with said circuitry means at selected intervals such that the tally of digital pulse signals is stored within said circuitry means which subsequently transfers the tally of digital pulse signals to said peripheral computer for analysis.

22. A radiation monitoring system as in claim 16, wherein said dose equivalent analyzing means comprises an integral computer in physical operative communication with said circuitry means such that said monitoring system is configured as a portable self contained unit, said dose equivalent analyzing means further comprising display means for externally displaying the dose equivalent estimate.

23. A radiation monitoring system as in claim 16, further comprising total dose calculating means for estimating the total dose from an incident radiation field.

24. A radiation monitoring system as in claim 23, wherein said total dose calculating means comprises:
   a calibrated PMOS transistor having a varying turn-on voltage which varies in correspondence with the total radiation dosage to which said PMOS transistor has been exposed; and
   total dose circuitry means in operative communication with said PMOS transistor for converting said varying turn-on voltage to a total dose estimate.

25. A radiation monitoring system as in claim 24, wherein said total dose circuitry means are in physical operative communication with said PMOS transistor, said total dose circuitry means further comprising total dose display means for displaying the total dose estimate.

26. A radiation monitoring system as in claim 24, wherein said total dose circuitry means comprises a peripheral computer configured to be operatively mated with said PMOS transistor at selected intervals.

27. A portable radiation monitoring system for analyzing the makeup of an incident radiation field to provide an dose equivalent and total dose estimate, comprising:
   a semiconductor detector having microstructure parallel p-n junctions, each said p-n junction defining a predetermined sensitive volume which is sensitive to radiation incident thereon such that electrical impulses of varying degrees are generated within said sensitive volume upon traversal thereof by radiation particles;
   a preamplifier configured to receive the electrical impulse generated within said sensitive volume responsive to incident radiation;
   a shaping amplifier in operative communication with said preamplifier for increasing the electrical impulse to a range suitable for processing by an analog-to-digital converter;
   an analog-to-digital converter in operative communication with said shaping amplifier for converting the electrical impulse into a digital pulse signal;
   a microprocessor in operative communication with said analog-to-digital converter for reading and processing the digital pulse signals according to their respective energy levels;
   a memory array configured to receive and sum the digital pulse signals from said microprocessor according to their energy levels so that a summation of digital pulse signals occurring within particular energy bands is generated;
   a peripheral computer configured to be operatively mated with said microprocessor at selected intervals for applying sensitive volume dependent weighting factors to the summations of electrical impulses, said weighting factors correlating to known energies generated by known radiation particles in sensitive volumes comparable to said sensitive volumes of said p-n junctions so that an dose equivalent estimate is generated by said peripheral computer;

a calibrated PMOS transistor having a varying turn-on voltage which varies in correspondence with the total radiation dosage to which said PMOS transistor has been exposed; and a peripheral computer configured to be operatively mated with said PMOS transistor at selected intervals for converting the varying turn-on voltage to a total dose estimate.

28. A method for qualitatively analyzing the dose equivalent from a complex incident radiation field, comprising the steps of:

subjecting to the radiation field an array of microstructure parallel p-n detectors having associated predefined sensitive volumes;

measuring and tallying according to energy levels digital pulse signals corresponding to voltage pulses generated within the sensitive volume of each detector responsive to incident radiation, said tallying providing a summation of digital pulse signals occurring within a particular energy band; and translating the summations of digital pulse signals into a dose equivalent estimate by applying predetermined sensitive volume dependent weighting factors to the summations of digital pulse signals falling within discrete energy channels, the weighting factors qualitatively correlating the energy deposition within an energy channel to known energies generated by known ionizing particles in comparable sensitive volumes.

29. The method as in claim 28, wherein said subjecting step comprises subjecting a crystal transistor to said radiation field.

30. The method as in claim 28, further comprising the step of shielding the array of microstructure detectors with preselected shielding material so that the array of microstructure detectors simulates specific biological tissue.

31. The method as in claim 28, wherein said measuring and tallying digital pulse signals comprises:

sending to a preamplifier a voltage pulse induced within the sensitive volume from incident ionizing particles;

increasing the preamplifier output signal with a shaping amplifier;

converting the shaping amplifier output signal into a digital pulse signal;

processing and routing with a microprocessor the digital pulse signals from all of the p-n junctions to a memory array configured to receive and sum the digital pulse signals according to their energy levels so that a summation of digital pulse signals occurring within a particular energy band is generated; and storing the summations of digital pulse signals in the memory array for subsequent analysis.

32. The method as in claim 28, wherein said translating step further comprises interfacing with a peripheral computer at selected intervals for transferring the summation of pulse signals thereto so that the peripheral computer applies the predetermined sensitive volume weighting factors to the summation of digital pulse signals.

33. The method as in claim 28, wherein said translating step further comprises sending the summations of pulse signals to an integral computer which directly applies the predetermined sensitive volume weighting factors to the summations of digital pulse signals.

34. The method as in claim 28, wherein said translating step further comprises forming the summations of digital pulse signals over a period of time into a representative pulse height spectrum, and partitioning the pulse height spectrum into discrete energy channels to which the weighting factors are applied.

35. The method as in claim 28, further comprising the step of calculating a total dose estimate from the complex radiation field.

36. The method as in claim 35, wherein said total dose calculating step comprises:

subjecting a calibrated PMOS transistor to the radiation field, the PMOS transistor having a varying turnon voltage which varies according to the total radiation dose the PMOS transistor has been exposed to;

measuring the turn-on voltage of the PMOS transistor, the turn-on voltage being representative of the total radiation dose from the radiation field; and converting the turn-on voltage into a total dose estimate.

37. The method as in claim 36, further comprising the step of interfacing the PMOS transistor with a peripheral computer for performing said translating.

38. The method as in claim 36, further comprising interfacing the PMOS transistor with internal circuitry for performing said converting, and displaying the total dose estimate.

39. A method for qualitatively estimating the total and dose equivalents from an incident complex radiation field, comprising the steps of:

subjecting a silicon crystal transistor to a radiation said transistor having a microstructure array of parallel p-n detectors with associated predefined sensitive volumes;

sending to a preamplifier a voltage pulse induced within the sensitive volume in response to incident radiation;

increasing the pre-amp output signal with a shaping amplifier to a voltage level suitable for processing by an analog-to-digital converter;

converting the shaping amplifier output signal into a digital pulse signal with an analog-to-digital converter;

processing and routing the digital pulse signals from all the p-n junctions with a microprocessor to a memory array configured to receive and sum the digital pulse signals according to their energy levels so that a summation of digital pulse signals occurring within a particular energy band is generated;

storing the summations of digital pulse signals in the memory array for subsequent analysis;

interfacing with a peripheral computer at selected intervals for transferring the summations of pulse signals thereto;

applying predetermined sensitive volume dependent weighting factors to the summations of digital pulse signals falling within discrete energy channels, the weighting factors qualitatively correlating the energy deposition within an energy channel to known energies generated by known ionizing particles in comparable sensitive volumes so that an dose equivalent estimate is generated;

subjecting a calibrated PMOS transistor to the radiation field, the PMOS transistor having a varying turnon voltage which varies according to the total radiation dose to which the PMOS transistor has been exposed; and interfacing with the peripheral computer at selected intervals for translating the turn-on voltage of the PMOS transistor into a total radiation dose estimate.

40. A method for qualitatively estimating the dose equivalent from a complex radiation field, comprising the steps of:

subjecting to the radiation field an array of microstructure parallel p-n detectors having associated predefined sensitive volumes;

measuring digital pulse signals corresponding to voltage pulses generated within the sensitive volume of each detector responsive to incident radiation;

applying predetermined sensitive volume dependent weighting factors to the individual digital pulse signals falling within particular energy channels, the weighting factors qualitatively correlating the energy of the digital pulse signal to known energies generated by known ionizing particles in comparable sensitive volumes;

storing the digital pulse signals in a memory array for subsequent retrieval; and converting the digital pulse signals into a useful dose equivalent reading.

* * * * *